US012487835B2

(12) United States Patent
Verma et al.

(10) Patent No.: US 12,487,835 B2
(45) Date of Patent: Dec. 2, 2025

(54) MANAGEMENT AND MONITORING OF DELEGATED SCOPE ON DEVICES

(71) Applicant: Omnissa, LLC, Mountain View, CA (US)

(72) Inventors: Gaurav Verma, Bangalore (IN); Karthikeyan Palanisamy, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 119 days.

(21) Appl. No.: 18/374,008

(22) Filed: Sep. 28, 2023

(65) Prior Publication Data

US 2025/0028538 A1 Jan. 23, 2025

(30) Foreign Application Priority Data

Jul. 19, 2023 (IN) .............................. 202341048503

(51) Int. Cl.
*G06F 9/44* (2018.01)
*G06F 9/445* (2018.01)

(52) U.S. Cl.
CPC ............................. *G06F 9/44505* (2013.01)

(58) Field of Classification Search
CPC ................. G06F 1/32; G06F 1/12; G06F 9/44
See application file for complete search history.

(56) References Cited

U.S. PATENT DOCUMENTS

| 11,614,955 B2* | 3/2023 | Glazer | G06F 9/452 |
| | | | 717/109 |
| 2012/0102455 A1* | 4/2012 | Ambat | G06F 9/45558 |
| | | | 717/100 |
| 2017/0255489 A1* | 9/2017 | Abebe | G06F 9/505 |

* cited by examiner

*Primary Examiner* — Keshab R Pandey
(74) *Attorney, Agent, or Firm* — Kim & Stewart LLP (57) ABSTRACT

Disclosed are various approaches for management and monitoring of delegated scope on devices. In some examples, A management agent on a client device receives a scope delegation profile that specifies a scope to delegate from the management agent to a particular application. A scope delegation software development kit (SDK) consumed by the management agent invokes a function of an operating system (OS)-based policy manager to delegate the scope to the particular application. The management agent receives delegated scope data specifying that the particular application utilized the scope and provides it to the management service.

20 Claims, 5 Drawing Sheets

MANAGEMENT AND MONITORING OF DELEGATED SCOPE ON DEVICES

RELATED APPLICATIONS

Benefit is claimed under 35 U.S.C. 119(a)-(d) to Foreign application No. 202341048503 filed in India entitled "MANAGEMENT AND MONITORING OF DELEGATED SCOPE ON DEVICES", on Jul. 19, 2023, by VMware, Inc., which is herein incorporated in its entirety by reference for all purposes.

BACKGROUND

In modern devices, access to certain functionalities can be delegated from one application or operating system to another application. For example, an Android® operating system can provide an application with additional capabilities by delegation from another application. Management services can include unified endpoint management (UEM), mobile device management (MDM), virtualization services, and other services. MDM services can manage and secure mobile devices that are used for enterprise productivity. UEM services can manage access to enterprise resources through a broad range of endpoints such as websites, desktops, mobile devices, and virtual devices, among others. The management services can use applications executed in physical and virtual devices to provide secure access to enterprise resources. In some examples, a management service can cause a device to assign a particular application to have access to these functionalities, whether the functionalities involve critical or mundane actions and features.

In some examples, the application that has been assigned to a particular functionality can be a third party application with respect to the management service. The usage of certain applications such as third party applications for these functionalities can cause communication problems, loss of control, and other issues. For example, the application can be opaque to the management service, lacking the ability to communicate important information for security and management purposes. The management service can also lack the ability to reassign the functionality or remove access to the functionality. Tracking application success and failure can become an issue as well. Even if the application is integrated with the management service, these problems can persist.

Further, if there are changes to the functionalities or calls that utilize or invoke the functionalities, then many components can require an update, including the application. This can cause enterprise and device inefficiency and failure as many applications and application versions are required to be updated. As a result, there is a need for more effective solutions for delegated functionalities for devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of monitoring and management of delegated scope for devices. Access to certain functionalities or scopes can be delegated from one application or operating system to another application. A management service can cause a device to assign a particular application to have access to a delegated scope. The application that has been assigned the delegated scope can be a third party application or a first party application with respect to the management service.

In existing solutions, usage of certain applications for these functionalities can cause communication problems, loss of control of the scope, and other issues. The application can lack the ability to communicate important information for security and management purposes. The management service can also lack the ability to recall, revoke, and reassign the functionality. Tracking application success and failure can become an issue as well. Even if the application is integrated with the management service, these problems can persist. Changes to the functionalities or calls that invoke the functionalities can necessitate time-consuming changes to many applications, causing enterprise and device inefficiency and failure as many applications and application versions are required to be updated.

However, the present disclosure describes mechanisms that can solve these problems faced by other solutions by providing a management-service-integrated scope delegation software development kit (SDK) that can be consumed by applications. This enables any application that consumes the management service's scope delegation SDK to implement the features as defined in the scope delegation SDK. Since the scope delegation SDK can involve a smaller more granular update transmission when functionalities are updated, the result can increase efficiency of deployment as well as reduce traffic and overall power consumption in a public or private local area network (LAN) or wide area network (WAN) environment.

In previous technologies, an application that delegated a certain scope of functionality is not able to perform that functionality after the delegation, the management system and administrators thereof will not know. If a delegation application programming interface (API) or a delegated scope API fails, the delegated scope can be lost, since the device admin application that delegated the scope can no longer claim back the scope. Correction of this issue can necessitate removal and reinstallation of multiple software components, such as the delegated application, a management agent, and in some cases a device operating system.

In this context, as one skilled in the art will appreciate in light of this disclosure, embodiments can achieve certain improvements and advantages over traditional technologies, including some or all of the following: (1) improving the functioning of computer systems and networks by providing a scope delegation SDK that applications consume to enable not only delegation but also monitoring, revocation, reclamation, and reassignment of delegated scope functionalities; (2) improving the flexibility of computer systems and networks by updating the scope delegation SDK rather than performing a complete application update; (3) improving the functioning of computer systems and networks, including reducing power consumption and network bandwidth usage, by enabling revocation, reclamation, and reassigning scope; (4) improving the functioning of computer systems and networks, including reducing power consumption and network bandwidth usage, by updating the scope delegation SDK rather than performing a complete application update; (5) improving the flexibility of computer systems and networks by providing a scope delegation SDK that enables delegated scope actions to be monitored, revoked, reclaimed, reassigned, and so forth.

Figure 1:
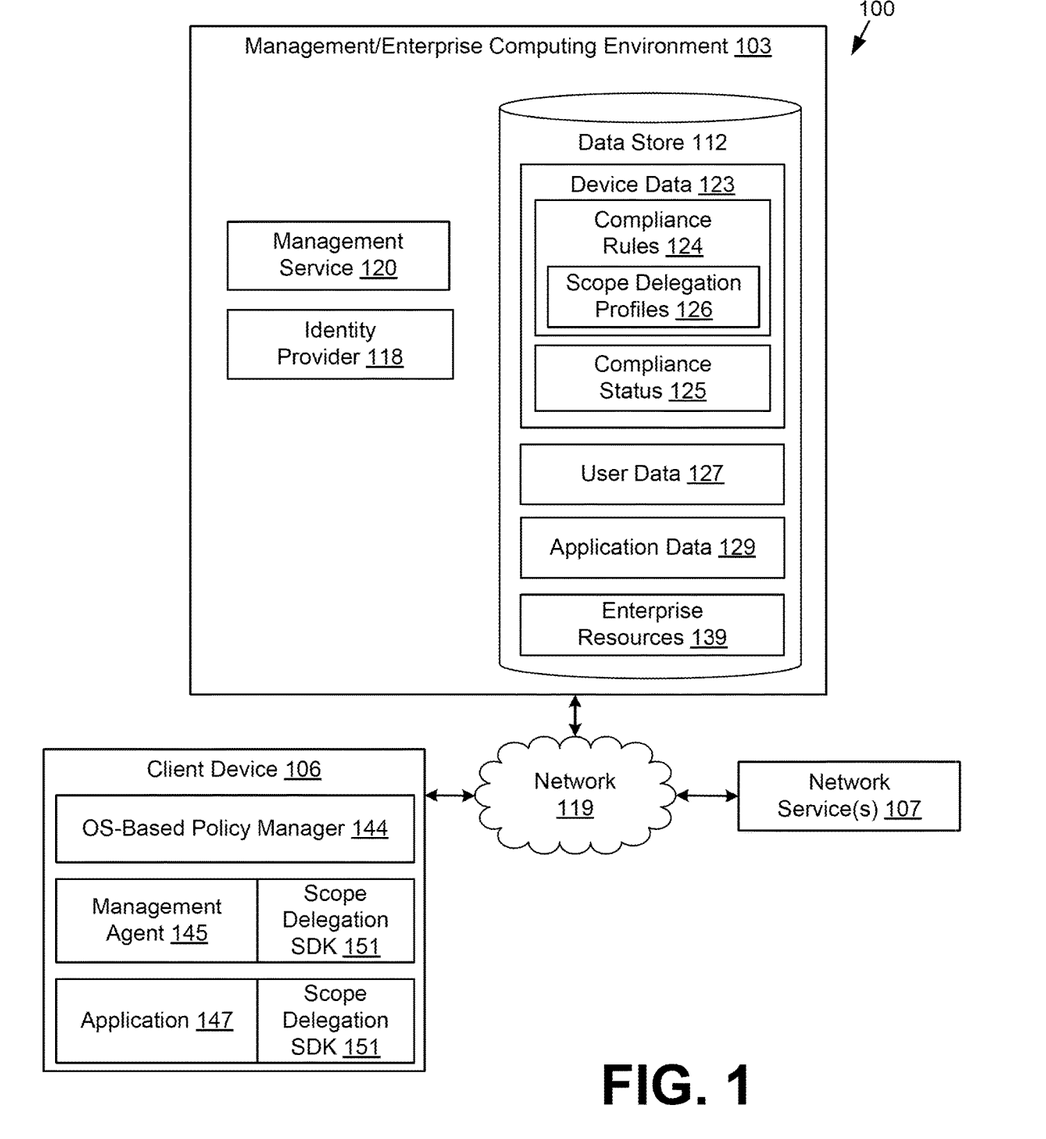
FIG. 1 is a block diagram of a networked environment that includes components that implement monitoring and management of delegated scope for devices, according to various examples of the disclosure.

FIG. 1 illustrates an example of a networked environment 100 according to examples of the disclosure. In the depicted networked environment 100, an enterprise computing environment 103 is in communication with at least one client device 106 and a network service 107 over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or another organization. The enterprise computing environment 103 can also include or be described as a management computing environment of a management service that is employed or utilized by an enterprise. The enterprise computing environment 103 includes a computing device, such as a server computer that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 includes multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

Various applications or other functionality can be executed in the enterprise computing environment 103. Also, various data can be stored in a data store 112 that can be accessible to the enterprise computing environment 103. The data store 112 can be representative of a plurality of data stores 112. The data stored in the data store 112 can be associated with the operation of the various applications or functional entities described below.

The components executed on the enterprise computing environment 103 can include a management service 120, an identity provider 118, and other applications, services, processes, systems, engines, or functionality not discussed in detail herein. The management service 120 can be executed in the enterprise computing environment 103 to monitor and oversee the operation of one or more client devices 106 by administrators. In some examples, the management service 120 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 120.

The management service 120 can include a management console that can allow administrators to manage client devices 106 that are enrolled with the management service 120. User interfaces can allow an administrator to define policies for a user account or devices associated with an enterprise environment. The user interfaces can also include, for example, presentations of statistics or other information regarding the client devices 106 that can be managed by the management service 120. The identity provider 118 can be considered components of the management service 120, and can work in concert to perform management for an enterprise.

The enterprise computing environment 103 can also execute an identity provider 118. The identity provider 118 can carry out federated user authentication on behalf of an enterprise. For example, the identity provider 118 can implement OAuth, SAML, or similar protocols that allow for federated user authorization or authentication. In examples of this disclosure, the identity provider 118 can also verify a user-and-device token provided by a client device 106 to provide multi-device SSO capabilities as described herein. The identity provider 118 can verify a user's credentials or identity and provide an authentication token, such as a SAML assertion, that can be provided to a network service 107 by an application on a client device 106 to authenticate the user's access to a service provided by the network service 107. The identity provider 118 can issue the authentication token to a client device 106 after verifying the identity of the user and/or client device 106 from which the user is attempting to access the network service 107. In the context of this disclosure, once a user has authenticated his identity from a first device, the identity provider 118 can authenticate the user from a second device that is managed by the management service 120 upon receiving a user-and-device token from the second device, where the user-and-device token can be verified by the identity provider 118.

The identity provider 118 can verify a user-and-device token issued by the management service 120 to a client device 106 that is enrolled as a managed device and that is associated with a particular user account. The user-and-device token can include information that allows the identity provider 118 to verify the user as well as the device. The user-and-device token can be signed so that the identity provider 118 can verify the authenticity of the token itself. If the user has already established his identity with the identity provider 118 from a first device, and the identity provider 118 subsequently receives a user-and-device token from a second device, the identity provider 118 can establish a SSO session with the second device if the user-and-device token can be validated. Validation can be performed by verifying the signature applied to the user-and-device token as well as the user and device identifying information contained within the token.

In some embodiments, the identity provider 118 can be implemented in a separate computing environment or by a separate entity other than the management service 120. The management service 120 can provide an application programming interface (API) with which the identity provider 118 can communicate to verify a user-and-device token or to obtain a public key with which the signature of a user-and-device token can be verified. The management service 120 can also provide an API through which the identity provider 118 can verify user identifiers or device identifiers that are embedded within a user-and-device token.

The management service 120 and/or identity provider 118 can also receive application usage data from applications or a management component installed on the client device 106. Applications on the client device 106 can report time and date information associated with the application usage. Additionally, cloud-based services can report login and logout information to the management service 120 or identity provider 118. A SSO client application that operates as a hub to access enterprise applications can be installed on a client device 106 and can report usage of enterprise applications to the management service 120 or identity provider 118.

The management service 120 or identity provider 118 can also obtain usage of VDI resources associated with a user from a VDI infrastructure environment. A VDI infrastructure environment can utilize the identity provider 118 for identity management and also report usage data to the management service 120 in some instances.

The data stored in the data store 112 can include device data 123, user data 127, application data 129, enterprise resources 139, and potentially other data. Device data 123 can include records to client devices 106 that are enrolled as managed devices with the management service 120. A record within device data 123 can include various security settings selected for enforcement on a client device 106 that is enrolled with the management service 120. Accordingly, a device record can include a device identifier associated with a device, such as the client device 106 and other data associated with managed devices. In some examples, device data 123 can also identify a user associated with or assigned to a particular client device 106. A device record can also store other device specific information, such as a device type, operating system type or version, applications that are required or optional for the device, or an enrollment status of the device. In this scenario, the device data 123 can also indicate whether a managed device is a computing device or a peripheral device, such as a printer, scanner, or another device that can be deployed in an environment and associated with a record in a directory service.

Device data 123 can include compliance rules 124 and compliance status 125 as well as other information for client devices 106. The compliance rules 124 can include scope delegation profiles 126. The scope delegation profiles 126 can specify a set of one or more device functionalities that are delegated from a device administration application to a delegated application. The device administration application can include the management agent 145 or another management component executed by the client device 106.

The delegated application 147 can refer to an application 147 that has been delegated to a particular set of one or more device functionalities specified in a scope delegation profile 126 for the client device 106. In some examples, a delegated functionality specified in a scope delegation profile 126 can be delegated as an exclusive privilege or exclusive ability of a single delegated application 147. However, in some examples a single functionality can be delegated to multiple applications 147 such that each of the applications 147 is delegated the functionality in a non-exclusive manner.

A compliance status 125 of a client device 106 represents whether the device is in compliance with one or more compliance rules 124. Various compliance rules 124 can be enforced by the management service 120 by the client device 106. Compliance rules 124 can be based on time, geographical location, or device and network properties. For instance, the client device 106 can satisfy a compliance rule 124 when the client device 106 is located within a particular geographic location. The client device 106 can satisfy a compliance rule 124 in other examples when the client device 106 is in communication with a particular local area network, such as a particular local area network that is managed by the enterprise computing environment 103. Furthermore, a compliance rule 124 in another example can be based upon the time and date matching specified values.

A compliance rule 124 can specify that a client device 106 is required to be off or in a low power "sleep" state during a specified time period. Another compliance rule 124 can specify that a client device 106 is required to be on or in a normal operation "awake" state during a specified time period. As another example, a compliance rule 124 can specify that a client device 106 is prohibited from rendering content that has been designated as confidential.

Another example of a compliance rule 124 involves whether a user belongs to a particular user group. For instance, a compliance rule 124 can include a whitelist or a blacklist that specifies whether particular users or groups of users are authorized to perform various functionalities, such as installing or executing a particular application 147.

Other examples of compliance rules 124 include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule 124 can specify that the client device 106 is required to prompt a user for a password or personal identification number (PIN) in order to unlock the device.

A compliance rule 124 can also require that the client device 106 be device encryption enabled, where data stored on the device is stored in an encrypted form. The data can be encrypted by a device certificate. A compliance rule 124 can also specify that the client device 106 is enrolled with the management service 120 as a managed device. Another compliance rule 124 can specify that the user is required to accept the terms of service that are presented by the management agent 145 on the client device 106. As another example, a compliance rule 124 can specify that the management agent 145 is required to periodically communicate or "check-in" with the management service 120 to report on its status. If a threshold amount of time has elapsed since the previous check-in of the client device 106, the device can be considered to have violated this compliance rule.

Another compliance rule 124 can specify that a client device 106 be running one of a specified variants or versions of a particular operating system. A compliance rule 124 can also specify that an enrolled device be manufactured by a particular manufacturer or have a particular manufacturer identifier. Another compliance rule 124 can specify that an enrolled device be a particular model name or model number. A client device 106 can also be considered out of compliance if the device is in a data roaming mode or has used a threshold amount of a periodic network data usage allowance.

Accordingly, the compliance status 125 indicates whether and to what extent a particular client device 106 is compliant with compliance rules 124 assigned to the client device 106 by the management service 120. The compliance status 125 can be determined by a management agent 145 on the client device 106 that analyzes the status of the client device 106 and reports compliance to the management service 120. In other examples, the compliance status 125 can be determined by the management service 120 based upon information about the status of the client device 106 that is reported by the management agent 145.

User data 127 contains information about user accounts in a user directory. User accounts can be maintained by a directory service or the identity provider 118. The user accounts can be associated with client devices 106 that are enrolled with the management service 120. The user data 127 can be associated the same user accounts that are verified by the identity provider 118. In some implementations, the identity provider 118 can rely upon a separate set of user account data or a user directory to determine whether to issue an authentication token to an application on behalf of the user. In other implementations, the user data 127 is a user directory associated with the identity provider 118, and the management service 120 accesses the user data 127 through an API provided by the identity provider 118.

User data 127 can include profile information about a user, authentication information about a user, applications that are installed on client devices 106 associated with the user, and other user information. For example, user data 127 can include information about client devices 106 that are associated with a user account of the user, enterprise resources 139 to which a particular user has access, such as email, calendar data, documents, media, applications, network sites, or other resources. The user data 127 can also identify one or more user groups of which a particular user is a member, which can in turn define the access rights of the user to one or more enterprise resources 139 as well as identify which applications should be deployed to a client device 106 associated with the user. To this end, the user data 127 can further identify one or more device identifiers that can uniquely identify client devices 106 that are associated with a user account of the user.

The network service 107 can be a computing environment that is operated by an enterprise, such as a business or another organization. The network service 107 includes a computing device, such as a server computer, that provides computing capabilities. Alternatively, the network service 107 can employ multiple computing devices that are arranged in one or more server banks or computer banks. In one example, the computing devices can be located in a single installation. In another example, the computing devices for the network service 107 can be distributed among multiple different geographical locations. In one case, the network service 107 includes multiple computing devices that together can form a hosted computing resource or a grid computing resource. Additionally, the network service 107 can operate as an elastic computing resource where the allotted capacity of computing-related resources, such as processing resources, network resources, and storage resources, can vary over time. In other examples, the network service 107 can include or be operated as one or more virtualized computer instances that can be executed to perform the functionality that is described herein.

The network service 107 can be hosted by a third party and provide various services to users of the enterprise. The services can be considered third-party-hosted or provided enterprise resources 139. As a result, providing access to the enterprise resources 139 can include, for example, providing a VPN tunnel using a tunnel server or providing identity services by the identity provider 118 that provide access to a network service 107. Access to the network service 107 can be federated to the identity provider 118 in some examples. Users can utilize a client device 106, an application 147, or a user interface generated by the network service 107 to access email, calendar, contacts, program services, desktop services, and other resources.

The client device 106 can represent multiple client devices 106 coupled to the network 119 using wired and wireless network connections. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 120 as a managed device of the enterprise.

The client device 106 can execute a management agent 145 or another management component that can communicate with the management service 120 to facilitate management of the client device 106. The management agent 145 can communicate with the management service 120 to enforce management policies, compliance rules 124, and scope delegation profiles 126, on the client device 106. For example, the management agent 145 can enforce data security requirements, install, remove or update security certificates, or write, modify, or delete certain data from the client device 106. The management agent 145 can also monitor network activity of the client device 106, the location of the client device 106, enforce password or personal identification number (PIN) requirements, or any other security or acceptable-use policies that are defined in the management service 120 and sent to the management agent 145 over the network 119.

To carry out local management of a client device 106, the management agent 145 can be installed and executed with elevated or administrative privileges on the client device 106. In some scenarios, the operating system can allow a particular application 147 or package to be identified as a device owner or a device administrator.

The operating-system-based (OS-based) policy manager 144 can include a component that performs scope delegation as operating system service of the client device 106. The OS-based policy manager 144 can be a device policy manager of an Android® operating system or another operating system. The OS-based policy manager 144 can include a public interface for managing policies enforced on a client device 106. The OS-based policy manager 144 can register a particular application 147 on a device administrator application. For example, the management agent 145 can be a device administrator application. A given method, function, or scope implemented by the OS-based policy manager 144 can be accessible to multiple delegated applications 147 unless the documentation for that method specifies that it is restricted to a single delegated application 147 or owner. Any application 147 calling an API is only allowed to pass as an argument a method, function, or scope component that it owns. If an application 147 passes an argument that identifies a scope for which it is not delegated or registered as an owner, the OS-based policy manager 144 or operating system can generate a security exception. The OS-based policy manager 144 can perform scope delegation that includes delegating or transferring administrative permissions to applications 147 other than a registered device administration application.

The OS-based policy manager 144 can have one or more device management APIs, which can correspond to various methods or functionalities that can be delegated using a scope delegation profile 126. In addition to various functionalities discussed previously, the functionalities or 'scopes' that can be delegated can include certificate management, certificate selection, managed application configuration management, blocking application uninstallation, application permissions management, package access state management, enabling/disabling system applications, retaining uninstalled applications, installing applications, network logging, security logging, and other functionalities. Each scope or functionality can be associated with a unique identifier or key that the scope delegation profile 126 that can be included as a reference to the functionality to delegate.

The certificate management functionality can enable the delegated application 147 to retrieve a list of, install, and remove device certificates from a device keychain managed by the device operating system. The certificate selection functionality can enable the delegated application 147 to select what certificates in the device keychain can be used by other applications 147 for authentication. A delegated application 147 with this scope can grant other applications 147 access to specific certificates, and can also intercept prompting requests, preventing an application 147 from prompting the user to select a certificate for authentication; in this case, the delegated application 147 can automatically select and use a particular certificate silently.

The managed application configuration can enable the delegated application 147 to manage configuration of settings for other applications 147. The blocking application uninstallation functionality can enable the delegated application 147 to prevent specified applications 147 from being uninstalled. The application permission management functionality can enable the delegated application 147 to set global permissions policies and management individual application permissions to other functions. The package access state management functionality can enable the delegated application 147 to hide, unhide, suspend, and resume applications 147. The system application management functionality can allow the delegated application 147 to enable or disable preinstalled and system applications 147.

The retain uninstalled applications functionality can enable a delegated application 147 to specify a set of applications 147 that are to be reinstalled when a user of the client device 106 logs out in a check-in check-out device usage paradigm. The install existing applications functionality can enable a delegated application 147 to specify a set of applications 147 to reinstall from a cache. The network logging functionality can enable a delegated application 147 to start, stop, and collect device network logs on the client device 106. The security logging functionality can enable a delegated application 147 to start, stop, and collect device security logs on the client device 106.

Initially, a single administrative application such as the management agent 145 can have permissions to invoke the various APIs and functions that are used to enable functionalities described. In tradition solutions without the scope delegation SDK 151, delegating an exclusive functionality can cause the management agent 145 to permanently lose permissions to that functionality without the ability to monitor, revoke, reclaim, or redelegate the functionality. However, the scope delegation SDK 151 can enable monitoring, revoking, reclaiming, and redelegating of delegated scopes, even for third party applications 147.

One or more applications 147 can be installed on the client device 106. As a managed device that is enrolled with the management service 120, some applications 147 can be installed by the management service 120. In one scenario, the management service 120 can send a request to the management agent 145 to retrieve and install a particular application 147 on the client device 106. In this sense, installation of the application 147 is initiated by the management service 120. The management service 120 can also provide configuration data for a particular application 147 that it installed on the client device 106.

Another example of an application 147 can be an enterprise hub application or SSO application through which a user can authenticate his or her identity and access enterprise applications. Such an application 147 can collect application usage data for applications associated with the enterprise and report the usage data to the management service 120 or the identity provider 118. In some examples, the management agent 145 can be considered an application 147.

An application 147 can consume the scope delegation SDK 151 to enable delegation, monitoring, revocation, reclamation, call generation and other management of scopes or functionalities that are provided or accessed using the APIs and interface functions of the OS-based policy manager 144 of the client device 106. The scope delegation SDK 151 can be considered a management component, since it can be developed, stored, and provided to third parties by a service provider of the management service 120. The scope delegation SDK 151 can in some cases be updatable without affecting other instructions and code of an application 147 or management agent 145 that has consumed it. This can provide more efficient usage of power and network bandwidth for updates to the APIs and other interface function of the OS-based policy manager 144 and the scope delegation SDK 151 that invokes them.

Figure 2:
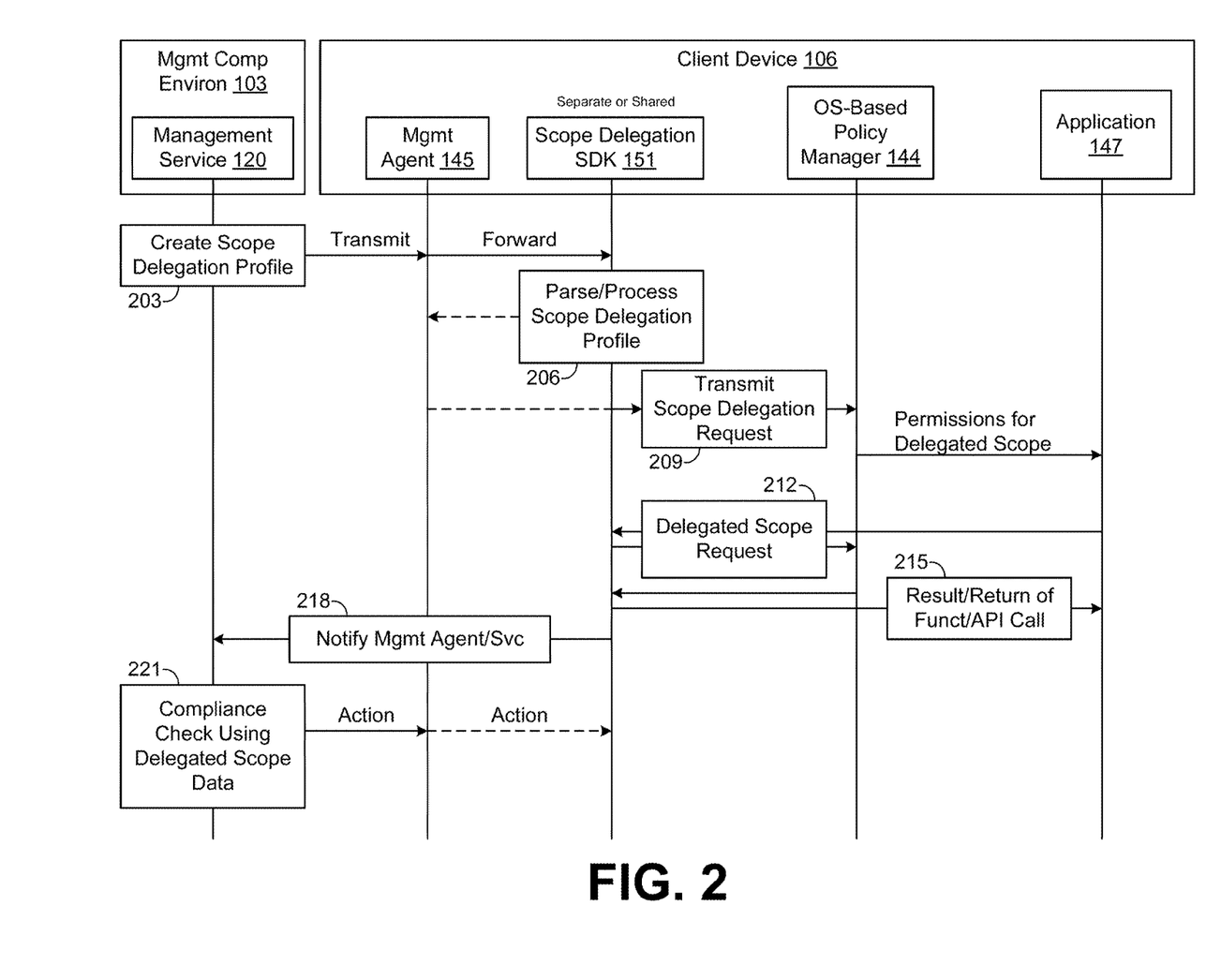
FIG. 2 is a sequence diagram that illustrates functionality implemented using components of the networked environment, according to an example of the disclosure.

Referring next to FIG. 2, shown is a sequence diagram that provides one example of how components of the enterprise computing environment 103 and the broader networked environment 100 can work in concert for the management of delegated scope profiles 126 for certain applications 147 on client devices 106. This can include delegation of functionalities, monitoring, revoking and reclaiming delegated functionalities, and so on. While the steps can be generally discussed as performed by a particular component, other components of the networked environment 100 can perform aspects of the same step.

At step 203, the management service 120 can generate a scope delegation profile 126. The management service 120 can include a console user interface. The console user interface can include user interface elements that an administrative user can manipulate to design the scope delegation profile 126. The user interface elements can enable the user to enter, select, or otherwise specify a set of functionalities to be delegated to a specified application 147 for a specified client device 106.

The management service 120 can transmit the scope delegation profile 126 to the management agent 145. The management agent 145 can consume the scope delegation SDK 151. In various examples, this instance of the scope delegation SDK 151 can be shared or separate from the scope delegation SDK 151 consumed and used by the application 147. However, in other examples a single scope delegation SDK 151 can be used by both the management agent 145 and the application 147.

At step 206, the scope delegation SDK 151 used by the management agent 145 can parse the scope delegation profile 126 to identify one or more scope to delegate to a particular application 147. Using the scope or function identifiers in the scope delegation profile 126, the scope delegation SDK 151 can generate one or more scope delegation requests, entering a function identifier as an argument. In some cases, a unique identifier of an application 147 is also provided as an argument. The scope delegation SDK 151 can generate the scope delegation requests to conform to a format or protocol used by the OS-based policy manager 144. A scope delegation request can include a function call that invokes an API or function of the OS-based policy manager 144 to delegate the scope from the management agent 145 to the application 147. In some examples, the OS-based policy manager 144 can require that the entity that currently has permissions to a function or scope must be the entity that requests scope delegation for the specified scope. For example, if the management agent 145 currently has exclusive permissions to a scope, then the management agent 145, or an instance of the scope delegation SDK 151 used by the management agent 145, is enforced as the entity that is enabled to request delegation or transfer of the requested scope.

At step 209, the scope delegation SDK 151 can transmit the scope delegation request to the OS-based policy manager 144. The management agent 145 can be registered with the OS-based policy manager 144 as device administrator and current owner of the scope specified in the scope delegation request or function call. The OS-based policy manager 144 can identify that the scope delegation request is received from the management agent 145 or the scope delegation SDK 151 that is being used by the management agent 145. The OS-based policy manager 144 can delegate the scope to the application 147 as specified by arguments in the request.

At step 212, the application 147 can use its shared or separate instance of the scope delegation SDK 151 to invoke a delegated scope using a function call or API call. This can be referred to as a delegated scope request or function call. The scope delegation SDK 151 can include instructions that generate a delegated scope request or function call according to a format or protocol used by the OS-based policy manager 144. The scope delegation SDK 151 invokes the delegated scope function call of the OS-based policy manager 144 to perform the specified scope or function.

At step 215, the OS-based policy manager 144 can return data embodying a result of the scope to the scope delegation SDK 151 consumed by the application 147. The scope delegation SDK 151 can provide the result to the application 147. The result can include data output by the scope or function.

At step 218 the scope delegation SDK 151 can provide delegated scope data to the management service 120. This can include providing a notification or transmission to the management service 120 that includes the delegated scope data including an identification of the functionality invoked by the application 147, a completion status indicating success or failure of the functionality. In some examples, the data can include the function call itself as well as the result or return of the invoked function.

In some examples, the scope delegation SDK 151 can provide delegated scope data to the management service 120 using the management agent 145. The management agent 145 can receive the delegated scope data, and can forward it to the management service 120. The management agent 145 can forward the delegated scope data immediately upon receipt, or can aggregate delegated scope data for multiple functions and provide aggregated data to the management service 120 periodically, on a scheduled basis, or in response to a predetermined threshold time, amount of data, number of functions, and so on. The management agent 145 can aggregate the delegated scope data while network connectivity is unavailable, and can transmit the aggregated data once connectivity is available or restored. The scope delegation SDK 151 can alternatively aggregate and transmit the delegated scope data periodically, on a scheduled basis, or in response to a predetermined threshold time, amount of data, number of functions, in response to network connectivity status, and so on.

At step 221, the management service 120 can perform a compliance check using the delegated scope data. The management service 120 can reference its compliance rules to see whether the application 147, the invoked function, and the result or return of the function are in compliance with compliance rules 124. Alternatively, the management service 120 can provide compliance rules 124 to the management agent 145, and the management agent 145 can perform this check on the client device 106.

A corrective action can be identified by the management agent 145 by receiving the action from the management service 120 or identifying it using locally stored compliance rules 124. The management agent 145 can then implement the action on the client device 106. In some examples, this can include commanding the scope delegation SDK 151 to return a delegated scope to the management agent 145 or another specified application 147. The scope delegation SDK 151 can invoke the scope delegation API of the OS-based policy manager 144 that specifies to pass the permissions for the specified function or scope back to the management agent 145 or another application 147.

Figure 3:
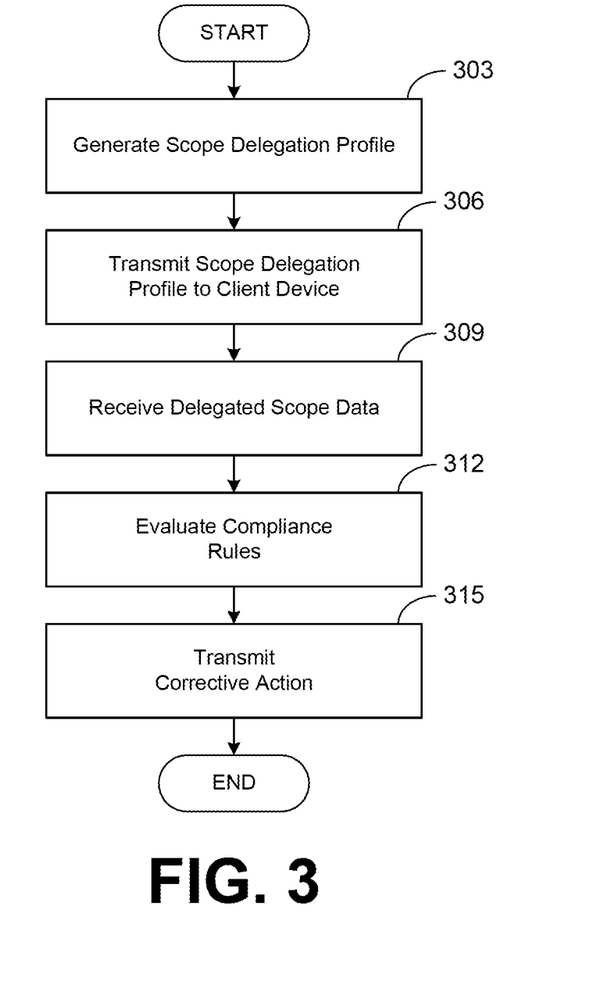
FIG. 3 is a flowchart that illustrates functionality implemented using components of the networked environment, according to an example of the disclosure.

Referring next to FIG. 3, shown is a flowchart that describes how the management service 120 and components of the enterprise computing environment 103 work in concert with other components of the networked environment 100 for management and monitoring of the delegated scope. While the steps can be generally discussed as performed by a particular component, other components of the networked environment 100 can perform aspects of the same step.

At step 303, the management service 120 can generate a scope delegation profile 126. The management service 120 can include a console user interface. The console user interface can include user interface elements that an administrative user can manipulate to design the scope delegation profile 126. The user interface elements can enable the user to enter, select, or otherwise specify a set of functionalities to be delegated to a specified application 147 for a specified client device 106.

At step 306, the management service 120 can transmit the scope delegation profile 126 to the client device 106. The management service 120 can place the scope delegation profile 126 in a command queue for the management agent 145. The management service 120 can transmit the scope delegation profile 126 when retrieved from the command queue.

The management agent 145 can provide the scope delegation profile 126 to the scope delegation SDK 151. The scope delegation SDK 151 can parse the scope delegation profile 126 and generate a scope delegation request. The management agent 145 can use the scope delegation SDK 151 to invoke a scope delegation API of the OS-based policy manager 144, delegating a specified scope to a specified application 147. The delegated application 147 can consume another instance of the scope delegation SDK 151, and can use it to invoke a scope API corresponding to the specified scope now delegated to that application 147. The scope delegation SDK 151 can provide the management service 120 with delegated scope data. In some cases, scope delegation SDK 151 can provide the delegated scope data to the management agent 145, which forwards it to the management service 120.

At step 309, the management service 120 can receive the delegated scope data. The delegated scope data can specify respective unique identifiers of the client device 106, the delegated application 147, and the scope or function. The delegated scope data can also include a status result indicating success or failure of the function. The delegated scope data can also include the function call used to invoke the delegated scope function, and a resulted returned by the function.

At step 312, the management service 120 can evaluate compliance rules 124 using the delegated scope data and other device telemetry such as location, installed applications, network connections, and so on. The management service 120 can evaluate a compliance status 125, and can identify a corrective action to perform based on the compliance rules 124 and the delegated scope data. For example, if the delegated scope data indicates that the wrong application 147 is using the specified scope, or a status result indicates a failure of the function, the management service 120 can determine that the appropriate action is to recall, reassign, or revoke the delegated scope. However, any of the actions discussed herein can be identified using the delegated scope data in view of compliance rules 124.

At step 315, the management service 120 can transmit a corrective action to the client device 106. The corrective action can include instructions to recall, reassign, or revoke the delegated scope, or perform another corrective action. In some examples, the management agent 145, the scope delegation SDK 151, and other components can perform the corrective action using the client device 106.

Figure 4:
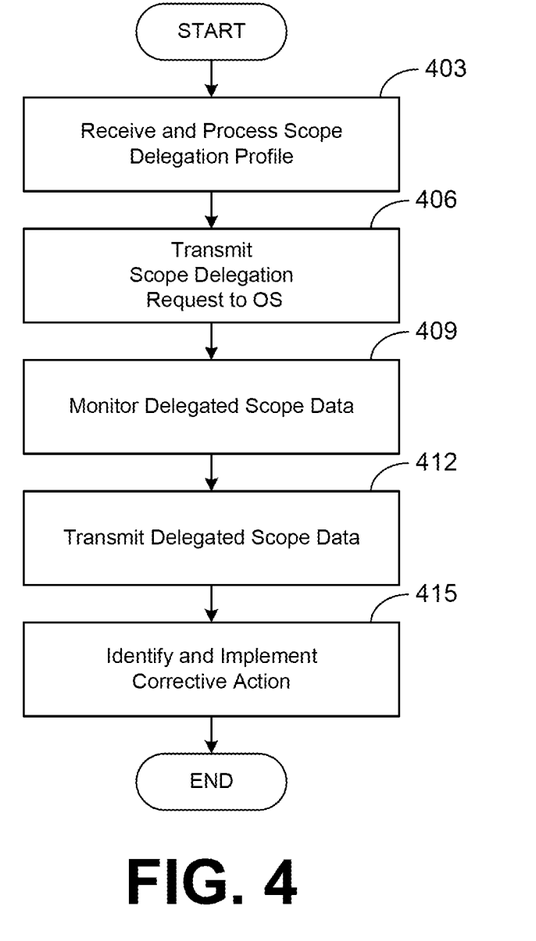
FIG. 4 is another flowchart that illustrates functionality implemented using components of the networked environment, according to an example of the disclosure.

Referring next to FIG. 4, shown is a flowchart that describes how the management agent 145 and the scope delegation SDK 151 work in concert with other components of the networked environment 100 for management and monitoring of delegated scope. While the actions can be referred to as being performed by the management agent 145, the scope delegation SDK 151 consumed by the management agent 145 and other components of the networked environment 100 can perform aspects of the same step.

At step 403, the management agent 145 can receive a scope delegation profile 126. The management agent 145 can consume a scope delegation SDK 151. The management agent 145 can use the scope delegation SDK 151 to parse the scope delegation profile 126. The management agent 145 can identify one or more scope to delegate to a particular application 147. Using scope or function identifiers in the scope delegation profile 126, the scope delegation SDK 151 can generate one or more scope delegation requests, entering a function identifier as an argument. The scope delegation SDK 151 can generate the scope delegation requests to conform to a format or protocol used by the OS-based policy manager 144. A scope delegation request can include a function call that invokes an API or function of the OS-based policy manager 144 to delegate the scope from the management agent 145 to the application 147.

At step 406, the management agent 145 can use the scope delegation SDK 151 to transmit the scope delegation request to the OS-based policy manager 144. The management agent 145 can be registered with the OS-based policy manager 144 as the device administrator and current owner of the scope specified in the scope delegation request or function call. The OS-based policy manager 144 can identify that the scope delegation request is received from the management agent 145 or the scope delegation SDK 151 that is being used by the management agent 145. The OS-based policy manager 144 can delegate the scope to the application 147 as specified by arguments in the request.

At step 409, the management agent 145 can use the scope delegation SDK 151 to monitor delegated scope data. In some examples, the scope delegation SDK 151 consumed by the management agent 145 and/or the delegated application 147 can intercept or identify scope API calls. The scope delegation SDK 151 can provide this information to the management agent 145. The management agent 145 can aggregate the delegated scope data or forward it immediately.

At step 412, the management agent 145 can transmit delegated scope data to the management service 120. The delegated scope data can include an identification of the application 147, an identification of the functionality invoked by the application 147, and a completion status indicating success or failure of the functionality. In some examples, the delegated scope data can include the function call itself, as well as the result or return of the invoked function.

The management service 120 can evaluate compliance rules 124 using the delegated scope data and other device telemetry such as location, installed applications, network connections, and so on. The management service 120 can evaluate a compliance status 125, and can identify a corrective action to perform based on the compliance rules 124 and the delegated scope data. Alternatively, the management agent 145 itself can receive and store compliance rules 124 from the management service 120, and can evaluate delegated scope data and other device telemetry locally on the client device 106.

At step 415, the management agent 145 can receive or identify a corrective action. If the management service 120 determines the corrective action, then the management agent 145 can receive the corrective action from the management service 120. However, if the management agent 145 evaluates the delegated scope data and the other device telemetry locally on the client device 106, then it can identify the corrective action specified in the compliance rules 124. The corrective action can include instructions to recall, reassign, or revoke the delegated scope, or perform another corrective action. In some examples, the management agent 145, the scope delegation SDK 151, and other components can perform the corrective action using the client device 106.

Figure 5:
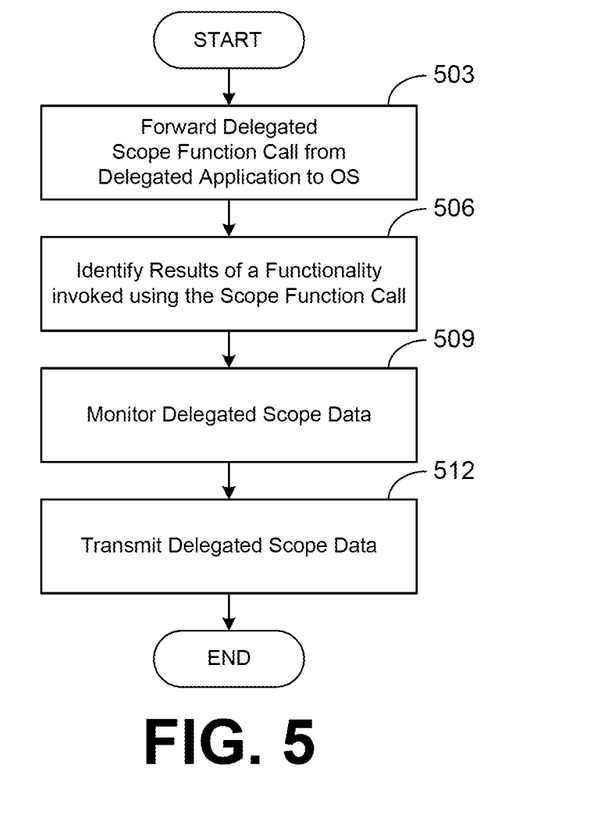
FIG. 5 is another flowchart that illustrates functionality implemented using components of the networked environment, according to an example of the disclosure.

Referring next to FIG. 5, shown is a flowchart that describes how the scope delegation SDK 151 consumed by an application 147 can work in concert with other components of the networked environment 100 for management and monitoring of delegated scope. While the actions can be referred to as being performed by the scope delegation SDK 151, other components of the networked environment 100 can perform aspects of the same step.

In step 503, the scope delegation SDK 151 can forward a delegated scope function call from a delegated application 147 to the OS-based policy manager 144. The delegated application 147 can refer to an application 147 that has been delegated a particular scope from a device administrator application such as the management agent 145. The delegated application 147 can consume the scope delegation SDK 151 to enable delegation functionalities including communications with the OS-based policy manager 144 to receive delegated scopes, perform certain scope functions, return scope back to the device administrator application, and so on. In this example, the delegated application 147 can be delegated as registered as owner of a particular scope or functionality. The delegated application 147 can indicate to perform the functionality corresponding to a delegated scope, and the scope delegation SDK 151 can generate and transmit a delegated scope function call from a delegated application 147 to the OS-based policy manager 144.

In step 506, the scope delegation SDK 151 can identify results of a functionality invoked using the delegated scope function call. The scope delegation SDK 151 can receive the results directly from the function performed by the operating system or OS-based policy manager 144. Alternatively, the scope delegation SDK 151 can read the results from a location it is stored in a data store 112 of the client device 106. The scope delegation SDK 151 can forward the delegated scope function results to the delegated application 147 that consumes the scope delegation SDK 151.

In step 509, the scope delegation SDK 151 can monitor and store delegated scope data. The delegated scope data can include the function call itself as well as the result or return of the invoked function. The delegated scope data can include an identification of the application 147, an identification of the functionality invoked by the application 147, and a completion status indicating success or failure of the functionality.

In step 512, the scope delegation SDK 151 can transmit the delegated scope data. In some examples, the scope delegation SDK 151 can provide this information to the management agent 145. The management agent 145 can aggregate and forward delegated scope data to the management service 120. Alternatively, the scope delegation SDK 151 can aggregate and transmit delegated scope data to the management service 120 directly.

While flowcharts and sequence diagrams can show an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or another system. If embodied in hardware, each element can represent a circuit or a number of interconnected circuits that implement the specified logical function(s).

Although flowcharts and sequence diagrams can show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 120, identity provider 118, management agent 145, applications 147, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. While aspects of the disclosure are discussed with respect to a particular figure, the aspects can be applied in combination with the other figures. Many variations and modifications can be made to the above-described examples without departing substantially from the spirit and principles of the disclosure. All of these modifications and variations are intended to be included herein within the scope of this disclosure.

What is claimed is:

1. A system comprising:
   at least one computing device;
   a management agent executed by the at least one computing device, wherein the management agent causes the at least one computing device to at least:
   receive, from a management service, a scope delegation profile that specifies a scope to delegate from the management agent to a particular application running on the at least one computing device;
   invoke, by a scope delegation software development kit (SDK) installed on the at least one computing device and consumed by the management agent, a function of an operating system (OS)-based policy manager to delegate the scope from the management agent to the particular application;

receive from the scope delegation SDK, delegated scope data specifying that the particular application utilized the scope; and transmit to the management service, the delegated scope data.

2. The system of claim 1, wherein the management agent is a device administrator application that owns the scope specified in the scope delegation profile.

3. The system of claim 1, wherein a separate instance of the scope delegation SDK is consumed by the particular application, and the separate instance of the scope delegation SDK provides the delegated scope data to the management agent.

4. The system of claim 1, wherein the delegated scope data comprises a scope delegation request that invoked the function of the OS-based policy manager.

5. The system of claim 1, wherein the delegated scope data comprises a completion status indicating success or failure of the function that is invoked.

6. The system of claim 1, wherein the delegated scope data comprises a data result that is output by the function that is invoked.

7. The system of claim 1, wherein the at least one application causes the at least one computing device to at least:

receive, from the management service, by the management agent, an action to perform, wherein the action is identified using the delegated scope data and compliance rules for the client device.

8. A non-transitory computer-readable medium comprising machine-readable instructions, wherein the instructions, when executed by at least one processor, cause at least one computing device to at least:

receive, from a management service, by a management agent executed by the at least one computing device, a scope delegation profile that specifies a scope to delegate from the management agent to a particular application running on the at least one computing device;

invoke, by a scope delegation software development kit (SDK) installed on the at least one computing device and consumed by the management agent, a function of an operating system (OS)-based policy manager to delegate the scope from the management agent to the particular application;

receive from the scope delegation SDK, by the management agent, delegated scope data specifying that the particular application utilized the scope; and transmit, by the management agent to the management service, the delegated scope data.

9. The non-transitory computer-readable medium of claim 8, wherein the management agent is a device administrator application that owns the scope specified in the scope delegation profile.

10. The non-transitory computer-readable medium of claim 8, wherein a separate instance of the scope delegation SDK is consumed by the particular application, and the separate instance of the scope delegation SDK provides the delegated scope data to the management agent.

11. The non-transitory computer-readable medium of claim 8, wherein the delegated scope data comprises the scope delegation request that invoked the function of the OS-based policy manager.

12. The non-transitory computer-readable medium of claim 8, wherein the delegated scope data comprises a completion status indicating success or failure of the function that is invoked.

13. The non-transitory computer-readable medium of claim 8, wherein the delegated scope data comprises a data result that is output by the function that is invoked.

14. The non-transitory computer-readable medium of claim 8, wherein at least one application causes the at least one computing device to at least:

receive, from the management service, by the management agent, an action to perform, wherein the action is identified using the delegated scope data and compliance rules for the client device.

15. A method performed using instructions executed by at least one computing device, the method comprising:

receiving, from a management service, by a management agent executed by the at least one computing device, a scope delegation profile that specifies a scope to delegate from the management agent to a particular application running on the at least one computing device;

invoking, by a scope delegation software development kit (SDK) installed on the at least one computing device and consumed by the management agent, a function of an operating system (OS)-based policy manager to delegate the scope from the management agent to the particular application;

receiving from the scope delegation SDK, by the management agent, delegated scope data specifying that the particular application utilized the scope; and transmitting, by the management agent to the management service, the delegated scope data.

16. The method of claim 15, wherein the management agent is a device administrator application that owns the scope specified in the scope delegation profile.

17. The method of claim 15, wherein a separate instance of the scope delegation SDK is consumed by the particular application, and the separate instance of the scope delegation SDK provides the delegated scope data to the management agent.

18. The method of claim 15, wherein the delegated scope data comprises the scope delegation request that invoked the function of the OS-based policy manager.

19. The method of claim 15, wherein the delegated scope data comprises a completion status indicating success or failure of the function that is invoked.

20. The method of claim 15, wherein the delegated scope data comprises a data result that is output by the function that is invoked.

* * * * *